United States Patent
Ho

(12) 
(10) Patent No.: US 11,405,511 B1
(45) Date of Patent: Aug. 2, 2022

(54) SYSTEM AND METHOD TO DELIVER MESSAGES AND DOCUMENTS USING A GLOBAL REGISTRY

(71) Applicant: Biscom Inc., Westford, MA (US)

(72) Inventor: William J. Ho, Carlisle, MA (US)

(73) Assignee: Biscom Inc., Westford, MA (US)

(*) Notice: Subject to any disclaimer, the term of this patent is extended or adjusted under 35 U.S.C. 154(b) by 0 days.

(21) Appl. No.: 17/405,746

(22) Filed: Aug. 18, 2021

(51) Int. Cl.
| | |
|---|---|
| *H04N 1/00* | (2006.01) |
| *H04N 1/32* | (2006.01) |
| *H04N 1/327* | (2006.01) |
| *H04L 51/08* | (2022.01) |
| *H04L 51/48* | (2022.01) |

(52) U.S. Cl.
CPC ....... *H04N 1/0022* (2013.01); *H04N 1/32096* (2013.01); *H04N 1/32406* (2013.01); *H04N 1/32713* (2013.01); *H04L 51/08* (2013.01); *H04L 51/28* (2013.01)

(58) Field of Classification Search
None
See application file for complete search history.

(56) References Cited

U.S. PATENT DOCUMENTS

| | | |
|---|---|---|
| 6,023,700 A | 2/2000 | Owens et al. |
| 6,618,763 B1 | 9/2003 | Steinberg |
| 6,633,630 B1 | 10/2003 | Owens et al. |
| 6,897,971 B1 | 5/2005 | Marshall et al. |
| 8,428,228 B1 | 4/2013 | Baxter, Jr. |
| 9,794,427 B2 | 10/2017 | Ho et al. |
| 10,348,937 B2 | 7/2019 | Ho et al. |
| 10,951,778 B1 | 3/2021 | Ho et al. |
| 2005/0097139 A1 | 5/2005 | Appelstal |
| 2006/0209342 A1 | 9/2006 | Ferlitsch et al. |
| 2008/0278740 A1 | 11/2008 | Bird et al. |
| 2009/0086278 A1 | 4/2009 | Vendrow et al. |
| 2009/0094254 A1 | 4/2009 | Akita et al. |
| 2014/0268219 A1 | 9/2014 | Ho et al. |
| 2015/0373208 A1 | 12/2015 | Watts et al. |

FOREIGN PATENT DOCUMENTS

WO        2001058119 A2      8/2001

OTHER PUBLICATIONS

Multi-Tech Systems Inc.,"FaxFinder® Fax Server (FF240-IP Administrator Guide)", Retrieved from Internet URL: https://www.multitech.com/documents/publications/manuals/s000493.pdf Published on 2016, pp. 113.

*Primary Examiner* — Lennin R Rodriguezgonzalez
(74) *Attorney, Agent, or Firm* — Blueshift IP, LLC; Robert Plotkin

(57) ABSTRACT

A method performed by at least one computer processor of a message delivery system includes generating a mapping among registry identifiers, destination identifiers, and preferred transmission methods of a plurality of users. Each user's destination identifier is associated with at least one delivery address for receipt of electronic package transmissions by the respective user. An outbound delivery request is received and includes a specified destination identifier for delivery of an electronic package. If the specified destination identifier is included in the mapping table, the mapping table is used to identify, based on the specified destination identifier, a preferred transmission method for transmitting the electronic package. The electronic package is transmitted using the preferred transmission method.

40 Claims, 7 Drawing Sheets

SYSTEM AND METHOD TO DELIVER MESSAGES AND DOCUMENTS USING A GLOBAL REGISTRY

BACKGROUND

A wide variety of options are available today for message and document delivery. These include email (non-secure or secure), SMS/text (non-secure or secure), file transfer (non-secure or secure), fax and voice. In current approaches, the transmission method employed for message and document delivery is established by the sender. Recipients have little, if any, input into how that delivery is sent.

At one time, facsimile (fax) transmissions were the default technology employed for rapid communication of documents among users remotely located from one another. Initially, public switched telephone networks (PSTNs) provided the communication network for fax transmissions. The development of the Internet provides another communication network for transmitting fax transmissions via Internet Protocol (IP). IP fax transmissions provide advantages in certain circumstances. For example, they are suitable for transmitting documents at high-resolution in monochrome or color to HD-enabled fax receiving devices.

Despite the availability of widely adopted alternatives, including email, the transmission of fax documents remains a common practice in certain industries due to the ease with which fax documents can be sent and received from different systems and applications without the need for the transmitting or receiving user to access a computer or perform file conversions, since a common file type (G3 Encoded Fax Image Format) is widely accepted as the file format for communication in the T.30 fax protocol.

Hardcopy fax transmissions also continue to have great utility where users are mobile within a work space, for example, at a car dealership and for some health care facilities. The nature of a hardcopy fax transmission allows a transmitting user to easily initiate the document transmission at a fax machine, without logging into or otherwise accessing a computer, and then walk away. Document receipt is also unencumbered because the receiving user need only pick up the document after it arrives at their fax machine once it is printed.

There are risks associated with the communication of both electronic documents (for example, email attachments) and faxed documents. Today, many users have turned to secure file transfer (SFT) technology to reduce the risks posed by cyber attacks on electronic documents and also those associated with faxed documents that are printed. For example, a conventional fax transmission is less secure than a secure file transfer at least because a hardcopy of the completed fax transmission sits at the fax machine until it is picked up. Furthermore, the receipt of a conventional fax transmission can also be delayed relative to SFT because of the time needed to print a large document with tens, hundreds, or even thousands of pages.

Historically, SFT applications were installed on enterprise servers to protect against the theft of electronic documents shared by users within the enterprise. More recently, SFT solutions are delivered as cloud services provided by web-based applications. These web-based services facilitate secure document access across enterprises.

The continued use of hardcopy fax equipment in combination with the continued development of all forms of electronic document sharing technology provides a wide variety of options for both facsimile transmission and facsimile receipt. For example, each of the transmitting party and the receiving party may use one of conventional fax, IP fax, secure file transfer, email, or text message to transmit and receive messages and documents.

This wide variety of transmission options creates both significant opportunities for satisfying users' preferences and significant complexity in the process. One drawback of existing systems is that they may fail to use the most effective method for transmitting any particular electronic package.

What is needed, therefore, are improved methods for transmitting electronic information efficiently and effectively to and from users across multiple enterprises.

SUMMARY

Various embodiments of methods, systems and apparatus described herein provide a global registry to allow carriers, fax servers, cloud fax services, file transfer services, email services, and other messaging systems to identify the preferred format for receiving transmissions of messages, documents, and other forms of electronic transmissions across multiple enterprises. In some embodiments, the universal nature of the global registry results from the use of an open standard.

According to one embodiment, a mapping table associates, for each of a plurality of users, a registry identifier of that user (e.g., an email address) with a destination identifier of that user (e.g., a fax number) and at least one preferred transmission method for transmitting electronic packages to that user (e.g., email transmission). When the preceding is employed in combination with a global registry, embodiments may provide a registry with a mapping table that includes fax numbers or other destination identifiers provided by one of a plurality of different telephone carriers or other service providers that is accessible to all of the carriers or other service providers. Registry identifiers and destination identifiers are examples of "endpoints," as that term is used herein.

Methods, systems, and apparatus described herein also provide an improved approach to detect spam faxes and spam messages by maintaining a dynamic database with the identities of approved users, accounts identified as suspected bad actors and the identities of known bad actors. For example, a telephone number may be reported by the receiving party to the global registry when the telephone number is the source of a spam fax received by the receiving party. The global registry may include an artificial intelligence engine or other heuristic methods to identify and blacklist this number and other sources of spam. If additional recipients also report the offending number, there may be increased confidence in its categorization as a bad actor. This community-driven reporting approach strengthens the positive identification of suspected and actual malicious senders. Additional data analysis may also proactively identify other senders with different identifiers (for example, phone numbers and email addresses) based on similar delivery characteristics such as the time of day of the transmission, the IP addresses employed by the sender, the physical location of the sender or the systems used by the sender, and the similarities of phone numbers employed by the sender to name some examples.

Other features and advantages of various aspects and embodiments of the present invention will become apparent from the following description and from the claims.

DETAILED DESCRIPTION

Figure 1:
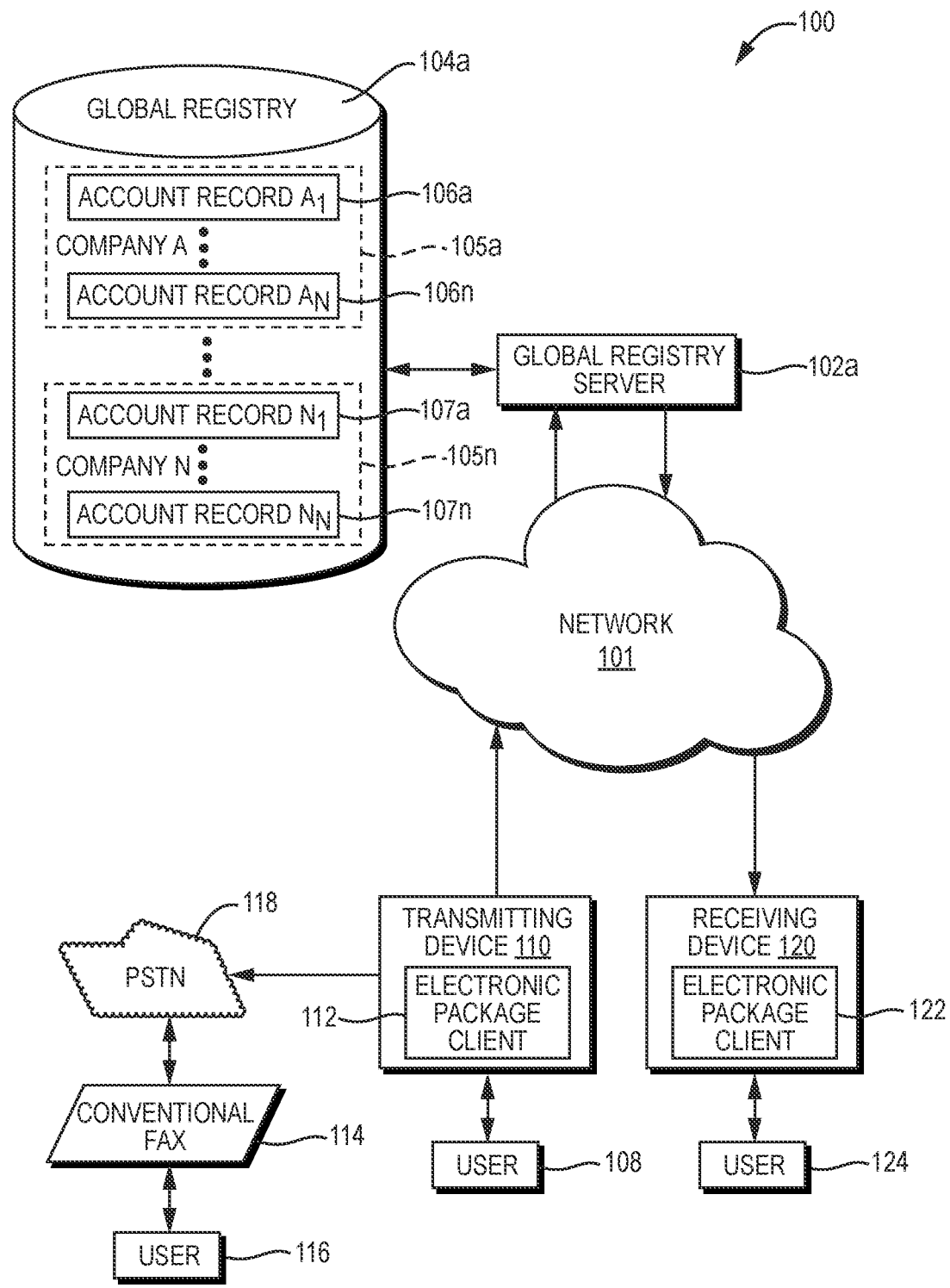
FIG. 1 is a dataflow diagram of a system for creating a global registry that maps registry identifiers (e.g., email addresses) to destination identifiers (e.g., fax numbers) and preferred transmission methods for transmitting electronic packages according to one embodiment of the present invention.

Reference will now be made in detail to exemplary embodiments of the present invention, examples of which are illustrated in the accompanying drawings, wherein like reference numerals refer to the like elements throughout. The exemplary embodiments are described below to explain the present invention by referring to the figures.

As described above, although there are a variety of existing transmission methods for transmitting electronic information to users (e.g., email, conventional fax, IP fax, secure file transfer, and text message), in existing systems the recipient has little or no control over the transmission method that is used to transmit information to that user. Instead, typically the sender exercises control over the transmission method that is used. Yet the recipient may have one or more preferences for receiving information, such as may depend upon their physical location, the time of day, the day of the week, the form or file type of the original document, and/or the confidential nature of the document, to name some considerations. Embodiments of the present invention address this problem by enabling recipients to exercise control over the transmission methods that are used to transmit electronic information to them.

Figure 2:
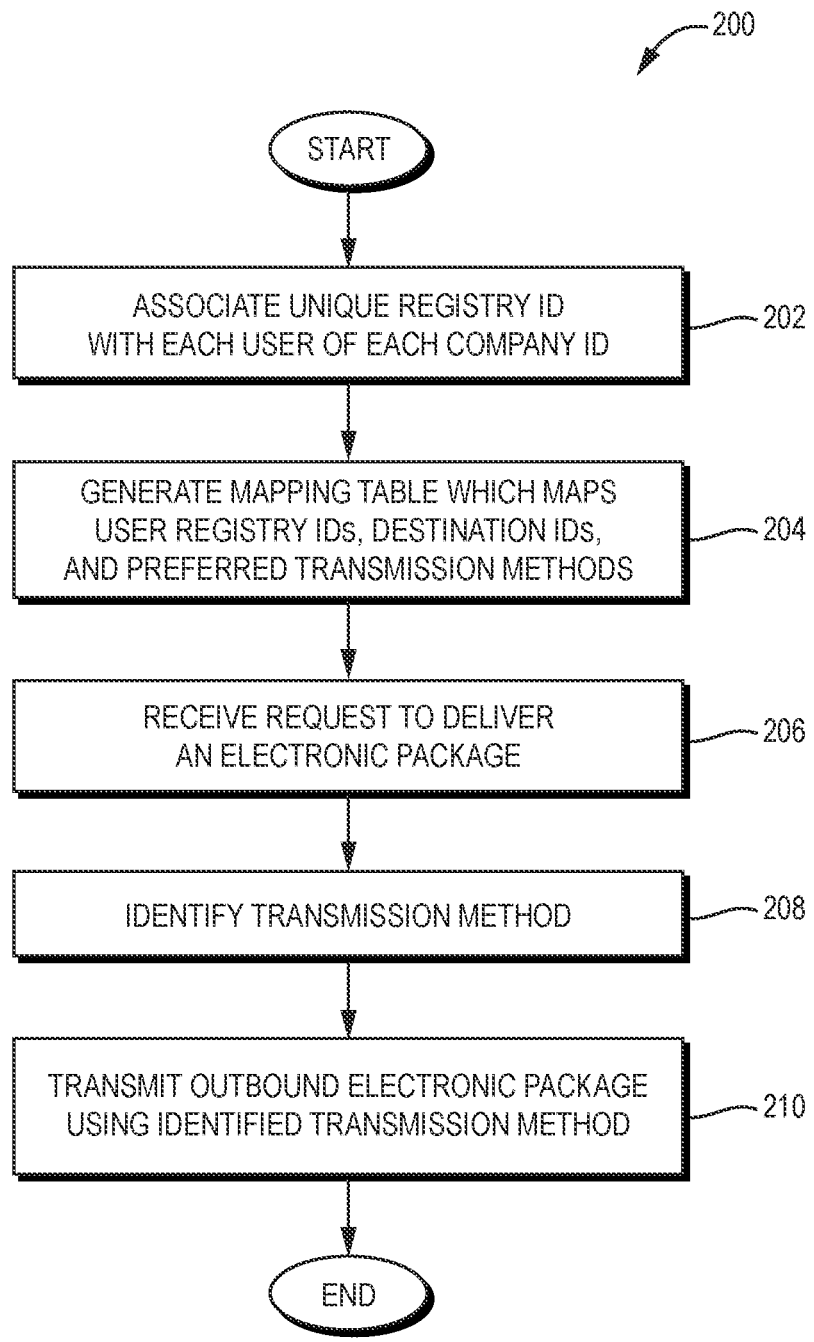
FIG. 2 is a flowchart of a method performed by the system of FIG. 1 according to one embodiment of the present invention.

Referring to FIG. 1, a dataflow diagram is shown of a system 100 for creating a global registry 104a that maps a user's "registry identifier" to at least one destination identifier of the user and at least one preferred transmission method of the user. The global registry 104a may include such mappings for each of a plurality of users. Referring to FIG. 2, a flowchart is shown of a method 200 performed by the system 100 of FIG. 1 according to one embodiment of the present invention.

As described in greater detail below, the system 100 allows the preferred transmission methods of a plurality of users to be stored in the global registry 104a. Each user's preferred transmission method may, for example, include at least one transmission method that is preferred by the user for receiving electronic packages. As a result, the system 100 provides for a message recipient-centered approach to the selection of the transmission method for electronic packages. These embodiments contrast with conventional approaches, in which the sender solely selects the transmission method. According to further embodiments, the system 100 provides an approach that selects the delivery method based on a combination of factors, such as both one or more of the recipient's preferred transmission methods and one or more of the sender's preferences (e.g., one or more of the sender's preferred transmission methods).

The aggregation of such preferences across multiple enterprises provides a global registry that may be employed by different carriers to provide methods of secure transmissions, both intracompany and intercompany. The system 100 is well suited for transmission methods that include any one or more of the following: a secure file transmission (SFT) transmission method, an email transmission method, a conventional fax delivery method, an IP fax delivery method, and a text message delivery method.

The system 100 may, for example, route electronic package transmissions from a transmitting device 110 to a conventional fax device 114 over a Public Switched Telephone Network (PSTN) or to a receiving device 120 over a digital electronic communication network 101. As described in more detail below, the receiving device 120 may be any kind of device which is capable of receiving electronic package transmissions from the transmitting device, such as a computer connected to the network 101. The digital electronic communication network 101 may include at least one of any type of network, whether wired, wireless, or both. For example, the digital electronic communication network 101 may include one or more of a Personal Area Network (PAN), a Local Area Network (LAN), a Home Area Network (HAN), a Campus Area Network (CAN), a Metropolitan Area Network (MAN), a Wide Area Network (WAN), and a Global Area Network such as the Internet.

The system 100 includes a global registry server 102a, which may perform a variety of functions within the system 100. For example, the global registry server 102a may maintain (e.g., write data to and/or read data from) the global registry 104a (also referred to herein simply a "registry") containing data representing a plurality of account records 106a-n, each of which represents a distinct user account associated with a first company, Company A. For example, and as will be described in more detail below, each of the account records 106a-n may represent an account associated with a distinct (e.g., unique) user, and may include data representing a unique registry identifier of that user, a destination identifier of that user, and at least one preferred transmission method of that user. Each user's account may include a mapping of that user's registry identifier, destination identifier(s), and preferred transmission method(s).

The global registry 104a may be stored in any one or more computer-readable media. For example, the global registry 104a may be stored "in the cloud," meaning that the global registry 104a may be stored on one or more computer-readable media, which may be distributed over a network, such as the Internet, and accessible via that network. The global registry 104a may, therefore, not be stored on any single computer-readable medium or accessible at any single Local Area Network. The global registry 104a may be distributed and/or replicated in any of a variety of ways.

According to the illustrated embodiment, the registry 104a contains data representing account records for distinct user accounts, where each account is associated with one of a plurality of different companies A-N, respectively. For example, the registry 104a contains a plurality of account records 107a-n, each of which represents a distinct user account associated with a second company, Company N. The account records for users associated with a selected company may be organized together in enterprise account record sets. For example, the registry 104a illustrates a first enterprise account record set 105a (including account records 106a-n) associated with Company A and a second enterprise account record set 105n (including account records 107a-n) associated with Company N.

Although the registry 104a is described as a "database" herein, more generally the registry 104a may be implemented as any data structure or collection of data structures. Furthermore, although only two companies, Company A and Company N, two enterprise account record sets 105a and 105n, and four accounts 106a, 106n 107a, 107n are shown in FIG. 1 for ease of illustration, the registry 104a may include any number of account records associated with any number of companies. Furthermore, the association of account records with distinct companies is merely an example and not a limitation of the present invention. Some or all of the account records in the registry 104a may, for example, not be associated with any company and may not be part of any accord record set. The Global registry server 102a may read data from and write data to the account registry 104a using any appropriate mechanism.

Further for ease of illustration, a single transmitting user 108, who accesses the global registry server 102a using a single transmitting device 110, is shown in FIG. 1. A receiving user 116 using a single conventional fax device 114 is shown in FIG. 1. A receiving user 124, who accesses the global registry server 102a using a single receiving device 120, is shown in FIG. 1.

The transmitting device 110 may, for example, be a computing device and may include an electronic package client 112, which may, for example, be a software application that is installed on the transmitting device 110 and which is designed to communicate with the global registry server 102a via an appropriate protocol. For example, the global registry server 102a may be in communication with the transmitting device 110 over the digital electronic communication network 101, for example, the Internet, using one or more protocols suitable for transmitting electronic packages, such as Fax over Internet Protocol (FoIP), or any protocol for transmitting email messages, electronic packages via secure file transfer, or any other kind of transmission disclosed herein. In another exemplary embodiment, the transmitting/receiving devices may include one or more browser software applications that a user may use to interface with the global registry server 102a.

The system 100 may also include any number of conventional fax devices. For ease of illustration, a single conventional fax device 114, used by the user 108, is shown in FIG. 1. The conventional fax device 114 may be connected to the Public Switched Telephone Network (PSTN) 118, and may be assigned a unique telephone number, referred to herein as a "conventional fax number," within the PSTN. The Global registry server 102a may be in communication with the conventional fax device 114 via the PSTN 118. Accordingly, the term "conventional fax device" refers herein to any device which includes means for transmitting and/or receiving non-IP faxes (e.g., faxes transmitted using the T.30 fax protocol) over the PSTN 118. The term "conventional fax number" refers herein to an identifier that may be used to address a fax over the PSTN.

The conventional fax device 114 may be connected to the computing device 110, such as by a wired connection (e.g., a USB cable, Ethernet cable) or a wireless connection (e.g., a Wi-Fi or BLUETOOTH connection). The user's computing device 110 may receive the conventional fax number 116 of the fax device 114 from the fax device 114. For example, the computing device 110 may transmit a request for the fax number 116 to the fax device 114, in response to which the fax device 114 may transmit the fax number 116 to the computing device 110. The computing device 110 may store the fax number 116 on any computer-readable medium. For example, the electronic package client 112 of the computing device 110 may receive the fax number 116 from the fax device 114 and store the fax number 116 on a computer-readable medium, such as a hard drive or cloud storage within or otherwise connected to the computing device 110.

Although the computing device 110 and the fax device 114 are shown as distinct devices in FIG. 1, this is merely an example and does not constitute a limitation of the present invention. Alternatively, for example, the conventional fax device 114 may be integrated into the computing device 110. For example, the fax device 114 may be implemented in a card that is installed within the computing device 110, and which may perform any of the functions disclosed herein as being performed by the fax device 114.

The receiving device 120 may be a computing device and may include an electronic package client 122, which may be similar or identical to the electronic package client 112 of the transmitting device 110. As users may be transmitters and/or receivers depending on the direction of dataflow, the receiving device 120 may be similar or identical to the transmitting device 110.

The global registry server 102a may transmit some or all user's account data 106a to electronic package clients 112 and/or 122. The electronic package clients 112 and/or 122 may store some or all of the data 106a locally. In an alternative peer-to-peer embodiment, all user account data may be stored among the electronic package clients 112 and/or 122.

Figure 3:
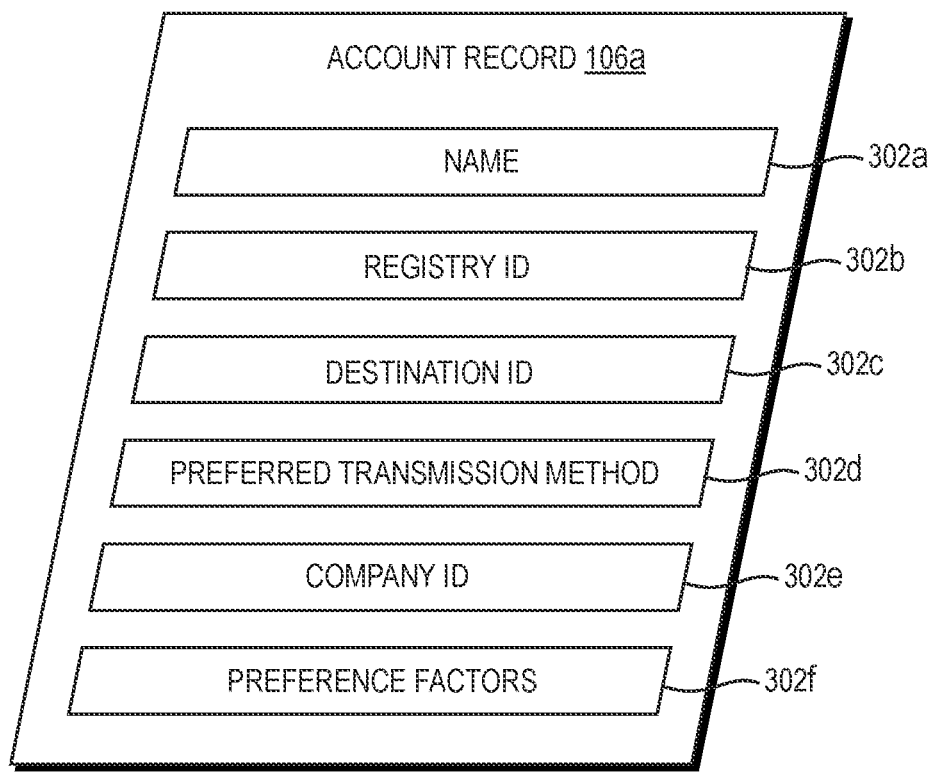
FIG. 3 is an illustration of a data structure that is used to store a user account record according to one embodiment of the present invention.

An account record may be created and maintained within the global registry 104a for each of one or more of the users 108, 116, and 124 (as well as for additional users not shown in FIG. 1). Some or all such account records may have the structure shown in FIG. 3. According to some embodiments, the global registry server 102a receives a registration request. The registration request includes information about a user who is to be registered. In response to receiving the registration request, the global registry server 102a creates a new account for the specified user by creating a new account record for the user in the account database 104a and storing account data for that account in the newly created account record. Creating the account data record for the user 108 may include creating and storing any of a variety of information. For example, if the account record 106a represents the account for user 108, FIG. 3 shows an example of data that may be stored by the global registry server 102a in the account record 106a.

The account record 106a includes a name of the user (e.g., the user's real name) in the name field 302a, a registry identifier of the user stored in the registry ID field 302b, and at least one destination identifier of the user in the destination ID field 302c.

The user's registry ID 302b may be any data that uniquely identifies the user's account record 106a among all of the account records in the global registry 104a (e.g., account records 106a-n and 107a-n). The registry ID 302b may, for example, be an ID that was selected and input by the user associated with the account record 106a, and which the system 100 validated as being unique. The registry ID 302b may, for example, be a human-readable ID, such as a sequence of human-readable characters. Examples of such registry IDs include an email address, fax number, or username of the user. The registry ID 302b need not, however, be human-readable. It may, for example, be or include non-human-readable data.

The user's destination ID 302c may be any data that represents at least one destination at which the user associated with the account record 106a may be addressed. Examples of the destination ID 302c include, for example, an email address, conventional fax number, IP fax number, or username of the user. As this implies, the user's registry ID 302b may be or include the same data as some or all of the user's destination ID 302c. As specific examples, both the registry ID 302b and destination ID 302c may be or include the user's email address and/or the user's fax number. The user's registry ID 302b may, however, be different than or not include some or all of the data in the user's destination ID 302c.

The user's destination ID 302c may include data representing a plurality of destinations at which the user associated with the account record 106a may be addressed. For example, the user's destination ID 302c may represent one or more of the following, in any combination, for the user associated with the account record 106a: the user's email address, conventional fax number, IP fax number, or username.

The account record 106a also may include data representing one or more preferred transmission methods of the user associated with the account record 106a, in the preferred transmission method field 302d. The preferred transmission method field 302d may, for example, include one or both of the following: (1) data representing one or more preferred transmission methods of the user for receiving electronic packages; and (2) data representing one or more preferred transmission methods of the user for sending electronic packages. In some embodiments of the present invention, the preferred transmission method field 302d includes data representing one or more preferred transmission methods of the user for receiving electronic packages, and does not include data representing any preferred transmission methods of the user for sending electronic packages. Examples of preferred transmission methods which may be represented by the data in the preferred transmission method field 302d include an email transmission method, a conventional fax transmission method, a fax over IP transmission method, a secure file transfer transmission method, and a text message transmission method.

The preferred transmission method field 302d may, for example, include one or both of the following: (1) data representing an ordered list of a plurality of preferred transmission methods of the user for receiving electronic packages; and (2) data representing an ordered list of a plurality of preferred transmission methods of the user for sending electronic packages. The order of each such list may indicate the user's relative preferences for using the transmission methods in the list for receiving or transmitting electronic packages. For example, the data representing an ordered list of a plurality of preferred transmission methods of the use for receiving electronic packages may include:

- a first element (e.g., at the beginning or end of the ordered list) representing the user's first choice of transmission method for receiving electronic packages;
- a second element (e.g., immediately following or preceding the first element in the ordered list) representing the user's second choice of transmission method for receiving electronic packages;
- a third element (e.g., immediately following or preceding the second element in the ordered list) representing the user's third choice of transmission method for receiving electronic packages;
- and so on.

The system 100 may, when transmitting an electronic package to a user, a first attempt to use the transmission method specified by the first element in the user's list of preferred transmission methods for receiving electronic packages and, if that first attempt fails, then attempt to use the transmission method specified by the second element in the user's list of preferred transmission methods for receiving electronic packages, and so on.

As another example, when transmitting an electronic package to a user, the system 100 may:

(1) determine whether the user is capable of receiving the electronic package via the transmission method specified by the first element in the user's list of preferred transmission methods for receiving electronic packages (such as by determining whether the user has an account for receiving the electronic package via that transmission method or whether the user has access to hardware and/or software for receiving the electronic package via that transmission method);

(2) if the system 100 determines that the user is capable of receiving the electronic package via the transmission method specified by the first element in the user's list of preferred transmission methods for receiving electronic packages, the system 100 may attempt to transmit the electronic package to the user via that method;

(3) if the system 100 determines that the user is not capable of receiving the electronic package via the transmission method specified by the first element in the user's list of preferred transmission methods for receiving electronic packages, the system 100 may determine whether the user is capable of receiving the electronic package via the transmission method specified by the second element in the user's list of preferred transmission methods for receiving electronic packages;

(4) if the system 100 determines that the user is capable of receiving the electronic package via the transmission method specified by the second element in the user's list of preferred transmission methods for receiving electronic packages, the system 100 may attempt to transmit the electronic package to the user via that method;

(5) and so on.

Everything said above in connection with a user's preferred transmission methods for receiving electronic packages is equally applicable to the use's preferred transmission methods for sending (transmitting) electronic packages. For example, the system 100 may, when transmitting electronic packages from a user, first attempt to use the transmission method specified by the first element in the user's list of preferred transmission methods for sending electronic packages and, if that first attempt fails, then attempt to use the transmission method specified by the second element in the user's list of preferred transmission methods for sending electronic packages, and so on.

As another example, when transmitting an electronic package from a sending user to a receiving user, the system 100 may:

(1) determine whether the receiving user is capable of receiving the electronic package via the transmission method specified by the first element in the sending user's list of preferred transmission methods for receiving electronic packages (such as by determining whether the receiving user has an account for receiving the electronic package via that transmission method or whether the receiving user has access to hardware and/or software for receiving the electronic package via that transmission method);

(2) if the system 100 determines that the receiving user is capable of receiving the electronic package via the transmission method specified by the first element in the sending user's list of preferred transmission methods for receiving electronic packages, the system 100 may attempt to transmit the electronic package to the receiving user via that method;

(3) if the system 100 determines that the receiving user is not capable of receiving the electronic package via the transmission method specified by the first element in the sending user's list of preferred transmission methods for receiving electronic packages, the system 100 may determine whether the receiving user is capable of receiving the electronic package via the transmission method specified by the second element in the sending user's list of preferred transmission methods for receiving electronic packages;

(4) if the system 100 determines that the receiving user is capable of receiving the electronic package via the transmission method specified by the second element in the sending user's list of preferred transmission methods for receiving electronic packages, the system 100 may attempt to transmit the electronic package to the receiving user via that method;

(5) and so on.

The term "email transmission method," as used herein includes, for example, any method for transmitting one or more email messages, with or without attachments, over the network 101, such as by using SMTP and/or POP protocols. The term "conventional fax transmission method," as used herein includes, for example, any method for transmitting a fax over the network 118, using non-IP protocols. The term "fax over IP transmission method," as used herein, includes, for example, any method for transmitting a fax digitally over the network 101. The term "secure file transfer transmission method," as used herein, includes, for example, any method of transmitting an electronic package over the network 101, which stores the electronic package in a remote storage medium (e.g., a storage medium that is accessible to the recipient's computing device over a local area network, wide area network, or cloud), and which enables the recipient to download the electronic package from the remote storage medium over a local area network, wide area network, or cloud. The term "text message transmission method," as used herein, includes, for example, any method with transmits a message or electronic package over the network 101 using a text messaging protocol, such as the short message service (SMS) or Apple iMessage protocols.

The account record 106a associated with a particular user may also include, in a company ID field 302e, a unique identifier that identifies an entity (e.g., company) with which the user is associated. The account record 106a associated with a particular user may also include, in a preference factors field 302f, one or more preference factors for the user.

The user's preferred method for receiving an electronic package, as represented by the data in the preferred transmission method field 302d, may, for example, represent and be used by the system 100 as a default method for transmitting electronic packages to the user. However, and as described in more detail below, that preferred method may vary based on results of an evaluation of the user's preference factors field 302f.

The term "electronic package," as used herein may, for example, include one or more files of any type or combination of types (such as word processing documents, spreadsheets, Adobe Portable Document Format (PDF) documents, audio files, video files, executable files, or compressed files (e.g., Zip files)). As another example, an electronic package may be implemented as or contain one or more electronic messages, such as fax messages, email messages, text messages, and audio messages. An electronic package may include both one or more files and one or more messages. A conventional fax message is an example of an electronic package as that term is used herein. An IP fax message is an example of an electronic package as that term is used herein.

In certain embodiments of the present invention, an electronic package may be transmitted using an electronic envelope. An envelope specifies delivery data for transmitting data in an electronic package. A single package may be transmitted multiple times via multiple envelopes using different delivery data each time. The system 100 may transmit (i.e., send and/or receive) electronic envelopes and other messages over the network 101. The division of data into electronic packages and electronic envelopes is merely an example and does not constitute a limitation of the present invention.

The entity ID field 302e allows the global registry server 102a to further refine the selection of the preferred method of transmitting an electronic package. For example, a first preferred transmission method may provide a high degree of security when employed within a company intranet. A second preferred transmission method, different than the first, may be employed to maintain a high level of security where the electronic package is being sent over the Internet to a user outside of the company. For example, the first preferred method used intracompany may be an email transmission method. In this example, the second preferred transmission method may be a secure/encrypted electronic file transmission method.

The global registry server 102a may create unique accounts for each user associated with a company. For each company, or other organization, the global registry server 102a may create a corresponding unique company identifier. The unique company identifier may then be assigned to each of the user accounts associated with the company. The association between user and company may, for example, result because the user is an employee of the company. Other facts may establish the association; for example, the company identification may be assigned with the company's approval to any individual (employee, contractor, or vendor) that the company has provided with access to the company intranet.

The global nature of the database 104a allows for the addition of any number of companies, or other organizations, with each enterprise assigned a company ID unique to them. Further, the global registry hosted by the database 104a may employ an open-source model to allow any fax or messaging vendor to access the account records 106a. This approach allows the recipient to receive faxes and other electronic packages via their preferred transmission method without requiring that they notify the various carrier, fax server or cloud fax vendor responsible for the sending fax user's account.

Referring to FIG. 2, in operation, a transmitting user 108 may desire to transmit a fax or other electronic package to one or both of receiving users 116 and 124. The system 100 associates separate unique registry identifiers with each of a plurality of users, such as receiving users 116 and 124 (FIG. 2, operation 202). Assume that account record 106a is the account record associated with user 116 and that account record 107a is associated with user 124. The system 100 may create account record 106a and store user 116's unique registry ID within that account record 106a, and also store the company ID of Company A within that account record 106b. Similarly, the system 100 may create account record 106b and store user 124's unique registry ID within that account record 107a, and also store the company ID of Company B within that account record.

Although not shown in FIGS. 1 and 2, the system 100 of FIG. 1 may assign one or more preferred transmission methods to each user account. As described above, if there are multiple acceptable methods, a priority can also be defined to support a cascading list of options to senders and recipients as dictated by the opposing preference and/or availability of a messaging method. The account database 104a may store, for each such account and corresponding user, a mapping (FIG. 2, operation 204) among: (1) a registry ID of the user; (2) at least one destination ID of the user; and (3) one or more preferred transmission methods of the user. The mapping may be multi-directional, such that the system 100 may, based on the value of any one of the fields 302a, 302b, and 302c for a particular user (e.g., in a particular account record), identify the value of one or both of the other fields 302a, 302b, and 302c for that user (e.g., in that particular account record). The mapping table may also be stored locally at each of a plurality of electronic package clients, e.g., electronic package clients 112 and 122.

The transmitting user 108 may submit, e.g., via one of the electronic package clients 112 or 122, a request to deliver an electronic package. The request may include a specified destination identifier, which specifies a recipient to which to deliver the electronic package. The registry server 102a may receive that request, e.g., over the network 101 from one of the electronic package clients 112 or 122 (FIG. 2, operation 206).

The request to deliver the electronic package may also include recipient authentication information, such as a keyword or password that the recipient is required to provide in order to retrieve the electronic package. Use of such recipient authentication information will be described in more detail below.

The system 100 identifies a transmission method to use to transmit the electronic package to the recipient (FIG. 2, operation 208). The system 100 may identify the transmission method in a variety of ways, such as by making the identification based on one or both of: (1) information in the request; and (2) information in the registry 104a.

For example, the registry server 102a may determine whether the registry ID in the request is in any of the account records in the registry 104a. For example, the registry server 102a may determine whether the registry ID field 302b of any of the account records in the registry 104a contains the registry ID in the request. If an account record is found which contains the registry ID in the request (e.g., in the registry ID field 302b of that account record), then the registry server 102a may identify a transmission method specified by the transmission method field 302d of that account record as the identified transmission method in operation 208.

The registry server 102a transmits the electronic package to the recipient specified by the request, using the transmission method that was identified in operation 208 (FIG. 2, operation 210). As described above, that transmission method may, for example, be an email transmission method, a conventional fax transmission method, an IP fax transmission method, a secure file transfer transmission method, or a text message transmission method. Instead of the registry server 102a transmitting the electronic package, alternatively one of the electronic package clients 112 or 122 may transmit the request, e.g., in response to receiving information from the registry server 102a about, e.g., the transmission method to use.

The system 100 may select a plurality of transmission methods in operation 208, in which case the registry server 102 may transmit the electronic package to the recipient using the plurality of transmission methods, e.g., simultaneously or substantially simultaneously. The plurality of transmission methods may, for example, be any of the plurality of transmission methods disclosed herein, in any combination.

If the sender's request to transmit the electronic package included recipient authentication information (e.g., a keyword or password), then the registry server 102a may require the recipient to input the recipient authentication information and only transmit the payload of the electronic package in response to receiving the recipient authentication information from the recipient. For example, the registry server 102a may prompt the recipient for the recipient authentication information. Then, if the recipient provides the recipient authentication information as input, the registry server 102a may, in response, provide the payload of the electronic package to the recipient. If the recipient does not provide the recipient authentication information as input, the registry server 102a may not provide the payload of the electronic package to the recipient.

According to some embodiments, the transmission method is identified in operation 208 by evaluating one or more preference factors for the account associated with the registry identifier included in the electronic package transmission request, for example, the preference factors stored in the preference factor field 302f of the account record associated with the recipient. The method 200 may identify the transmission method in operation 208 as the transmission method specified by one or more of the preference factors.

Depending on the embodiment, the preference factors may, for example, include the time of day and/or the day of week that the request is received. Furthermore, the preference factors may vary in relative importance based on other conditions. For example, the preference factors stored in the preference factor field 302f for account record 106a may indicate that electronic package transmissions sent to the user associated with the account during normal business hours be transmitted using the conventional fax delivery method for receipt at a fax machine located in the recipient's office. These same preference factors may also indicate that fax transmissions sent outside of normal business hours be transmitted using the secure electronic file delivery method to allow the recipient to securely access the fax content when remote from the office. The preference factors may include minimum security requirements, such as a requirement that at least a certain minimum level of encryption be used to transmit packages to a particular user.

According to some embodiments, identifying the transmission method in operation 208 may also include evaluating metadata concerning the contents of the fax transmission. For example, an optical character recognition (OCR) process may gather information from the contents of the payload of the electronic package itself. The information may be processed to evaluate patterns, language and/or document type. This information may be used to determine the priority of the payload and/or the confidential nature of the payload, as two examples. The system 100 may include an artificial intelligence engine to improve the accuracy and repeatability of the recognition and classification. Machine learning may be employed to provide the system 100 with an ability to adapt to new information with a high degree of accuracy in document classification. Referring to the example in the immediately preceding paragraph, an emergency fax transmission sent to the user associated with the account record 106a may be identified based on the payload contents. Other preference factors may be reduced in priority based on the emergency nature of the payload, and the system may transmit the electronic package using the text message delivery method regardless of the time of day in this example.

According to some embodiments, preference factors for both the recipient of the electronic package and the sender of the electronic package may be evaluated to identify the transmission method in operation 208. That is, on receipt of an outgoing fax transmission, preference factors included in the account record 106a-n, 107a-n for each of the recipient and the sender, respectively, may be evaluated by the system 100 to determine the preferred transmission method.

Figure 4:
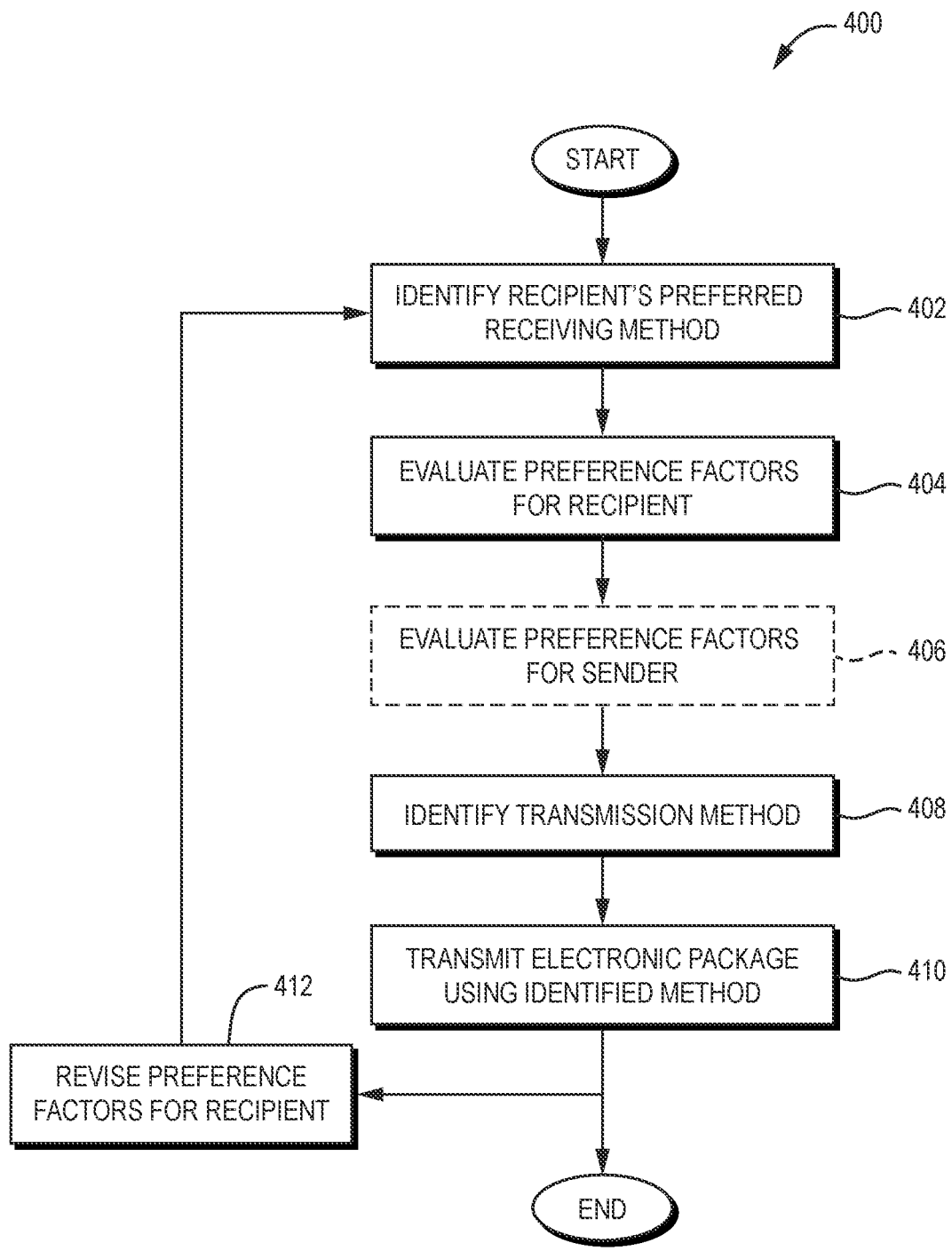
FIG. 4 is a flowchart of a method for evaluating preference factors to identify a preferred transmission method to transmit an electronic package according to one embodiment of the present invention.

Embodiments of the present invention may incorporate the preceding receiver/sender preference factor evaluation to further improve the selection of the transmission method in operation 208. For example, referring to FIG. 4, a flowchart of a method for evaluating preference factors to identify a transmission method to transmit an electronic package is illustrated according to one embodiment of the present invention. The process 400 illustrated in FIG. 4 may be included in an overall electronic package transmission process, for example, as illustrated and described with reference to FIG. 2, beginning at operation 208.

The recipient's preferred receiving method is identified at the operation 402, for example, the user's default preferred receiving method may be the secure electronic file delivery method. At the operation 404, the preference factors for the recipient are evaluated against the state of conditions found at the time the electronic package transmission request is received. Optionally, at the operation 406, the preference factors for the sender may also be evaluated against the state of conditions found at the time the electronic package transmission request is received. The evaluation of the full set of preference factors determines the current preferred transmission method for the outgoing electronic package at the operation 408. The outgoing electronic package is then transmitted using the identified transmission method at the operation 410.

Embodiments of the present invention may use machine learning to identify the transmission method in operation 208. For example, embodiments of the present invention may use machine learning to train a model based on data representing transmission methods previously used by the recipient to receive electronic packages. The resulting model may then be used to identify, in operation 208, the transmission method to use to transmit a subsequent electronic package to the same recipient. Such machine learning may be trained not only based on previous transmission methods, but also based on parameters such as time of day, location, and file format. Machine learning may also be used for example, to update the preference factors for the recipient (operation 412), such as based on the transmission method that was identified in operation 408 and used to transmit the outgoing electronic package.

The method 400 may update the preference factors for the recipient in other ways. For example, the recipient may provide input to the system 100 indicating an update to be made to the recipient's preference factors. Such input may, for example, indicate a preference for receiving electronic packages using one or more particular transmission methods. The method 400 may update the recipient's preference factors based on such input, such as by changing the recipient's preferred transmission method to a method indicated by the recipient's input.

After the electronic package is transmitted to the recipient, the recipient may transmit another electronic package (referred to herein as a "reply") to the sender. The recipient may transmit the reply to the sender using any of the techniques disclosed herein in connection with sending the original electronic package by the sender to the recipient. In some embodiments, the system 100 may automatically select, as the transmission method for the reply, the same transmission method (e.g., the sender's preferred transmission method) that was selected for sending the original electronic package in operation 208. In other embodiments, the recipient may select the transmission method for sending the reply, even if that transmission method differs from the transmission method used to transmit the original electronic package. A user (e.g., sender or recipient) may forward an electronic package to one or more users. Recipients and senders may continue a conversation through multiple replies and/or forwards to include other participants. A recipient may reply multiple times to a single electronic package.

Embodiments of the present invention may store a record of each electronic package transmitted in instances of operation 210. In this way, embodiments of the present invention may create an audit log containing information representing a plurality of electronic packages transmitted by the system 100. Any of a variety of information about such electronic packages may be stored in the audit log, such as one or more of the following: sender, recipient, payload, file format, transmission method, date, access status (opened, viewed, downloaded), and time of day. Information in the audit log may be protected against unauthorized access, such as by using one or more of encryption, authentication, and access permissions.

Figure 5:
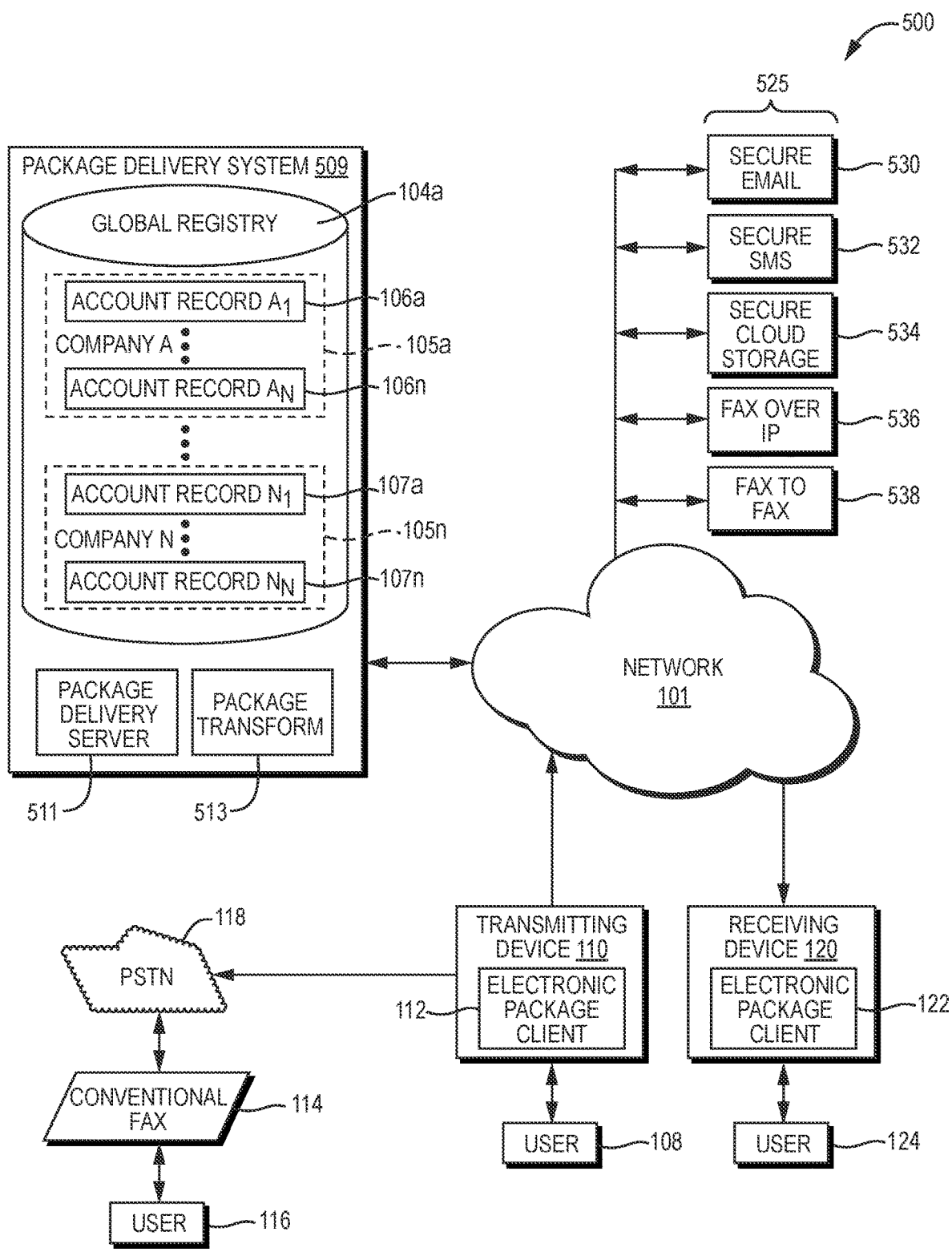
FIG. 5 is a dataflow diagram of a system for creating a global registry that maps a registry identifier to a destination identifier and a preferred transmission method according to another embodiment of the present invention.
Figure 6:
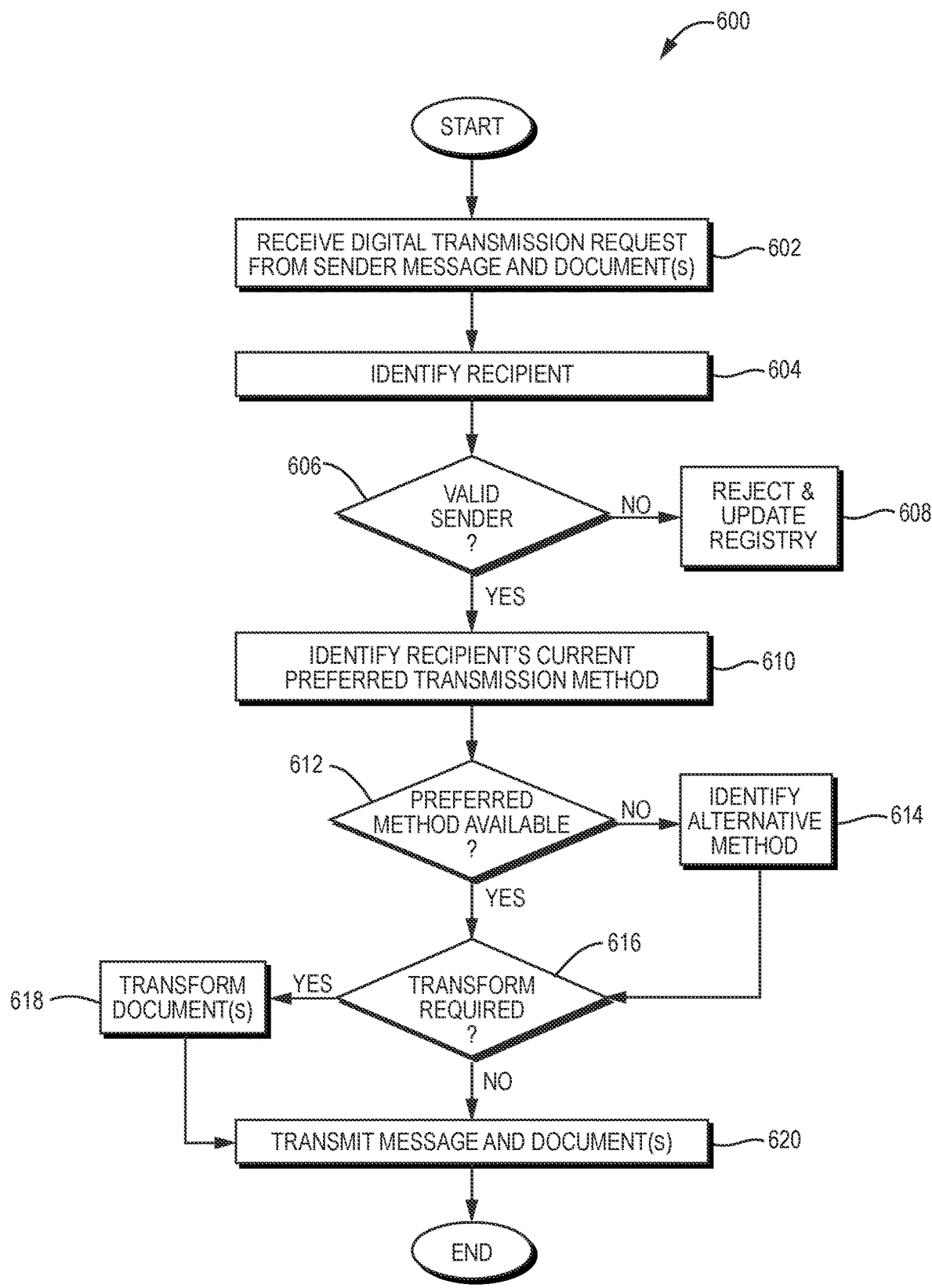
FIG. 6 is a flowchart of a method performed by the system of FIG. 5 according to one embodiment of the present invention.

Referring now to FIG. 5, a dataflow diagram is shown of a system 500 for creating a global registry that maps a registry identifier to at least one transmission method identified as the recipient's preferred transmission method for receipt of electronic packages according to one embodiment of the present invention. Referring to FIG. 6, a flowchart is shown of a method 600 performed by the system 500 of FIG. 5 according to one embodiment of the present invention.

The system 500 allows an organization of preferred transmission methods for individual users who are associated with uniquely identified entities. In various embodiments, the system 500 provides for a message recipient-centered approach to the selection of the transmission method for messages and documents. This approach contrasts with those offered by conventional systems that operate based solely on the sender's preference. The system 500 also allows any of a variety of delivery services to register with a global registry to utilize capabilities of the system 500, in particular, the mapping of user transmission preferences with destination identifiers that uniquely identify respective users. A registration process for delivery services is illustrated and described below with reference to FIG. 7.

The system 500 is well suited for delivery services that include delivery of messages and/or documents via any of:

email (e.g., encrypted or otherwise secure email); secure electronic file transfer; text message (e.g., encrypted or otherwise secure text message); conventional fax; and IP fax. Other delivery methods may be employed depending on the embodiment. The system 500 may route document transmissions via any of the preceding methods from the transmitting device 110 to the receiving device 120 over the digital electronic communication network 101. The system 500 includes a plurality of delivery services 525, for example, third party services that are registered with the global registry 104*a*. According to the illustrated embodiment, the delivery services 525 may include one or more secure email services 530, secure SMS services 532, secure cloud storage services 534, Fax over IP services 536 and Fax to Fax services 538. Further, a single third-party service provider may offer any combination of the services 530, 532, 534, 536, 538.

The architecture of the registry is open and flexible, providing an extensible list of attributes and functionality. This architecture supports both existing and novel messaging methods which may not currently exist by allowing new services to define and publicize their delivery method—e.g. a URL or other location of a service, requirements for authentication (e.g. username/password, multi-factor authentication, etc.), encryption level, return statuses, method of data upload/download, etc. Supporting an extensible architecture guarantees future compatibility and support for as-yet unknown methodologies, data and file support, addressing systems, and interactivity options.

According to the illustrated embodiment, the global registry 104*a* is included in an electronic package delivery system 509 that may perform a variety of functions within the system 500. According to some embodiments, the electronic package delivery system 509 includes a document delivery server 511 and a document transform engine 513. The document delivery server 511 operates to provide the document delivery system with the capability to transmit electronic packages in any manner available to users 108, 116, 124. According to one embodiment, the electronic package delivery server 511 operates to provide the electronic package system with the capability to transmit electronic packages via any of secure email delivery, secure electronic file delivery, secure text message delivery, conventional fax delivery, IP fax delivery or other delivery methods. In general, communication between the delivery services 525 and the electronic package delivery system 509 occurs via the network 101. Electronic package transmission via the electronic package delivery system 509 also occurs via the network 101.

The electronic package delivery server 511 may perform a variety of other functions within the system 500. For example, the electronic package delivery server 511 may perform operations described above with reference to FIG. 1 and the global registry server 102*a*. As one example, the electronic package delivery server 511 may maintain the global registry 104*a* and the associated account records. According to these embodiments, the electronic package delivery server 511 may operate to establish account records for users, to allow delivery services to register with the electronic package delivery system 509, and to update and maintain the accuracy of the registry. Accordingly, the electronic package delivery server 509 may read data from and write data to the account database 104*a* using any appropriate mechanism.

In various embodiments, the electronic package transform engine 513 processes electronic package payloads (e.g., messages and/or documents) received in a first format to transform the payload (e.g., messages and/or documents) into a different format to meet the requirements of the preferred delivery format. Various examples are provided herein. The transformations may include, for example: a transformation from a written electronic file type (PDF, MSWord, etc.) to text; a transformation from a written electronic file type (PDF, MSWord, etc.) to an audio file; and a transformation from a native electronic file type to a different electronic file type (for example, MSWord to PDF). Other transformations may be performed by the electronic package transform engine depending on the embodiment. According to one embodiment, the electronic package transform engine 513 is included as an element of the electronic package delivery server 511.

The various delivery services 525 may employ the electronic package delivery system 509 differently depending on their needs. In a first approach, the delivery service employs the electronic package delivery system 509 to access the global registry 104*a* to determine the preferred transmission method for a current delivery request. The delivery service 525 then transmits the payload using the preferred method. In a second approach, the delivery service 525 employs the electronic package delivery system 509 to determine the preferred transmission method for a current delivery request while also employing the electronic package delivery system 509 to complete the delivery request by transmitting the payload included in the request. In yet another approach, the delivery service 525 employs the electronic package delivery system 509 to determine the preferred transmission method for a current delivery request, completes the delivery themselves where they have the capability to deliver via the preferred transmission method or employs the electronic package delivery system 509 to complete the delivery request when they do not have the required capability.

According to some embodiments, the system 500 includes a global registry server, for example, the global registry server 102*a* (illustrated in FIG. 1), as an element of the electronic package delivery server 511. According to other embodiments, the system 500 may include a separate global registry server as illustrated in FIG. 1 or as a separate element in the electronic package delivery system 509, and in combination with the electronic package delivery server 511.

In general, the system 500 maintains the database 104*a* containing data representing the plurality of account records 106*a-n*, each of which represents the distinct user accounts associated with a first company, Company A. As described above with reference to FIG. 1, user accounts for a plurality of different companies may be included in the database, for example, the plurality of account records 107*a-n*, each of which represents a distinct user account associated with a second company, Company N. The account records 106*a-n* may represent an account associated with a unique destination identifier and primary fax number and may map that unique destination identifier to the user transmission preferences including any of the services offered by the delivery services 525. Further, the account records for users associated with a selected company may be organized together in enterprise account record sets as described above.

The transmitting device 110 may include the electronic package client 112, which may, for example, be a software application that is installed on the transmitting device 110 and which is designed to communicate with an IP fax server via an appropriate protocol. However, in some embodiments, the transmitting device 110 and receiving device 120 do not include an electronic package client. Instead, the users may employ a different electronic package delivery software application that is installed on the transmitting device 110 and the receiving device 120 depending on the delivery services 525 employed by the respective user. In some embodiments, a web-based application is employed for document transformation (if needed), and message and document transmission.

The global registry 104a may be employed to create the account records 106a-n, 107a-n with or without a global registry server, depending on the embodiment. With either approach, the account record organizes the user's account details (including preferences) illustrated in FIG. 3. As described above with reference to FIG. 3, the account record 106a may include the user's preferred method of receiving an electronic package transmission stored in the preferred receive method field 302d. However, in further embodiments, the preferred receive method field 302d identifies the preferred receive method for messages and documents transmitted in any format. That is, the preferred receive method 302d is the preferred method regardless of whether the sender is transmitting a fax document or an electronic package that originates as a fax, a text, an email, a secure electronic file transfer or some other format. According to further embodiments, the preferred receive method field 302d includes more than one preference that may at least in part depend on the original form of the message or document. The preferred receive method field 302d may be provided as a plurality of fields in the account record 106a in some embodiments.

In general, the user's preferred method of receiving electronic packages provides a default. However, the preferred method may vary based on results of an evaluation of the preference factors as is described in greater detail below.

When employed with the system 500, the unique identifier that identifies the entity with which the user is associated and is stored in the company ID field 302e allows a further refinement of the selection of the preferred method of receiving a message/document transmission as described above with reference to fax transmissions. The global registry 104a may also create unique accounts for each user associated with a company. For each company, or other enterprise, the global registry 104a may create the unique company identifier. The unique company identifier is then assigned to each of the user accounts associated with the company by the global registry 104a.

The global nature of the database 104a allows for the addition of any number of companies, or other enterprises, with each enterprise assigned a company ID unique to them. Further, the global registry hosted by the database 104a may employ an open-source model to allow any delivery service provider to access the account records 106a. This provides a centralized approach to allow a recipient to receive messages/documents via their preferred transmission method without requiring that the recipient notify each of the delivery service providers 525 or the senders of the preference. This centralized approach also provides a system 500 that may dynamically adjust the preferred transmission method based on preference factors associated with the receiving party, the sending party or both as described below. The preference factors may be applied to change the preferred transmission method in real time, for example, based on a change from one day of the week to another, one hour to another, or a change in the receiving user's location as some examples.

In operation, a transmitting user 108 may desire to transmit an electronic package to a receiving user, for example, the user 124. A request for delivery of the electronic package is received by the sender's message delivery service 525 (FIG. 6, operation 602). The request includes identifying information concerning the recipient. For example, the identifying information may include a registry ID or other information included in the account record 106a such as the user's name and/or the user's destination ID.

In various embodiments, the global registry 104a is employed as an intermediary to receive the delivery request including the identifying information. The global registry 104a identifies the recipient (FIG. 6, operation 604) using the information stored in the account records, 106a-n, 107a-n.

In some embodiments, the system operates to identify requests that are spam, junk or other nuisance deliveries (FIG. 6, operation 606). For example, the global registry 104a may track all deliveries. Recipients, for example, the user 124, may report deliveries that are spam, junk or another form of malicious or nuisance delivery. This allows a form of community identification of any bad actors to reduce or eliminate their acts via the system 500. Senders are also provided with knowledge about the recipient's spam settings. This is helpful to senders because they are aware of delivery requests that should not be made to a particular recipient.

If the system 500 identifies the sender as an invalid sender, the system 500 may reject the delivery request (FIG. 6, operation 608). The system 500 may also update a record concerning the sender in the global registry 104a to reflect the sender's current attempt at transmitting spam via the system 500. While this operation is illustrated in FIG. 6 as being included in the operation 608, the registry update may be performed as a separate operation depending on the embodiment. The identification of an invalid sender may also be based on the contents of the electronic package either alone or in combination with the identity of the sender. For example, a recipient may employ the global registry 104a to effectively screen some but not all communications being transmitted by a particular sender. In various embodiments, the records maintained by the global registry 104a for the sender and/or recipient may reflect the preceding.

If the delivery request is from a valid sender, the recipient's preferred transmission method is identified by the global registry 104a (FIG. 6, operation 610). As described above with reference to FIG. 2 and operation 208, the recipient's preferred transmission method may be determined using the information provided in the account record 106a-n, 107a-n for the account associated with destination identifier included in the delivery request.

As described above, the preferred transmission method may include any of a secure email delivery of messages and documents; a secure electronic file delivery method; a secure text message delivery method; a conventional fax delivery method; an IP fax delivery method; or another delivery method. Further, the determination of the recipient's current preferred transmission method may be determined by evaluating one or more preference factors for the account associated with the recipient, for example, the preference factors stored in the preference factor field 302f of the account record associated with the recipient. Depending on the embodiment, the preference factors may include the time of day and/or the day of week that the requested delivery is received. The preference factors may also vary in relative importance based on other conditions. As one example, a recipient's preferred delivery method may include email during business hours the recipient expects to be in the office, secure electronic file delivery during periods where the user expects to be in a home office and text message delivery outside of business hours. However, the system 500 including the global registry 104a may support significant customization by individual user.

Other recipient preferences may include a preference to receive documents in a native format or in a consistent file format such as a PDF. In some situations, a recipient may find that an audio message is preferred over a transcribed document. As another example, a recipient may prefer that an SMS message should be converted to an audio message. According to further embodiments, the global registry 104a may employ information concerning the recipient to assist the recipient to overcome limitations created because of a disability.

As another example, the preference factor may concern the type of message or document being sent. Where the document includes personal financial information or personal medical information the recipient's preferred delivery method may include secure electronic document delivery method. Where the document is transmitted via fax the recipient's preferred delivery method may include delivery via a high (fine) resolution such as 200 dpi. In another example, the recipient's preference may result in a message originating as an email being transformed and delivered as a text message. In yet another example, the recipient's preference may result in a message originating as a voice recording or another type of audio file being transformed and delivered as a secure text message.

An evaluation of metadata concerning the contents of the message and/or document to be transmitted may also be employed in an identification of the receiver's preferred transmission method. Depending on the original format of the document, the information may be gathered from document-contents via OCR, other images processing methods and/or other forms of document processing either alone, in combination with one another. The system 500 may include an artificial intelligence engine to improve the accuracy and repeatability of the recognition and classification. Machine learning may be employed to provide the system 500 with an ability to adapt to new information with a high degree of accuracy in document classification.

With the recipient's current preferred delivery method known, the system 500 operates to determine whether the preferred method is available (FIG. 6, operation 612). The approach employed may vary depending on the embodiment. There are a variety of reasons that the preferred delivery method may not be available. For example, the recipient may not currently have cell coverage at a time when their current preferred delivery method requires cellular coverage (an SMS delivery). Other factors may include an inability of the recipient to access the Internet where the current preferred delivery method requires Internet access. If a method of delivery fails or is not accessed within a certain timeframe, then the system can use past behavior to identify a delivery method that is most likely to succeed.

If the current preferred delivery method is not available, an alternative delivery method that is available is identified (FIG. 6, operation 614). Another reason the preferred delivery method may not be available is that the sender's delivery service does not have the capability required to transmit the message and/or document via the recipient's preferred delivery method. According to one embodiment, the need to select an alternative delivery method is determined following an initial unsuccessful attempt using the recipient's current preferred transmission method.

For example, where the global registry 104a is employed as an intermediary to notify a delivery service of a recipient's delivery preference, the recipient's current delivery preference may be compared with the delivery service's capabilities to determine whether the delivery service may meet the recipient's requirements. For example, a Fax over IP service employed by the sender may not have the ability to transmit electronic packages via a secure electronic document delivery method or vice versa. According to some embodiments, the delivery service employs the global registry 104a to complete a delivery on its behalf where the delivery service does not offer the recipient's current preferred delivery method.

If the current preferred delivery method is not available, the system 500 may prompt the recipient to provide input indicating an alternative delivery method, such as by displaying an on-screen message or sending a message (e.g., a text message) to the recipient requesting an alternative delivery method. The system 500 may then receive input, from the recipient, indicating an alternative delivery method. The system 500 may then transmit (or attempt to transmit) the electronic package to the recipient using the alternative delivery method indicated by the recipient.

When the preferred method is available or an available alternative is identified, the delivery request is evaluated to determine whether the message and/or document requires a transformation to transmit via the selected method (FIG. 6, operation 616). As described above, the recipient's preference may result in a message originating as an email being transformed and delivered as a text message. In yet another example, the recipient's preference may result in a message originating as a voice recording or another type of audio file being transformed and delivered as a text message. As a further example, where documents originate as a fax, the recipient's preference may require use of the secure electronic file delivery method via the secure cloud storage 534.

Where the delivery service is utilizing the global registry 104a as an intermediary to both identify the recipient's delivery preference and to complete delivery of the message and/or document(s), the global registry 104a may complete the necessary transformation (FIG. 6, operation 618) before transmitting the message/documents (FIG. 6, operation 620). Alternatively, where a delivery preference results in the need for the transformation of a message or document and the global registry 104a is initially employed only as an intermediary to notify the delivery service of a recipient's delivery preference, the capabilities of the delivery service to complete the required transformation are evaluated. If the delivery service may complete the transformation, the delivery service will complete the transformation (FIG. 6, operation 618) and transmit the message and/or document(s) (FIG. 6, operation 620). Alternatively, the delivery service may utilize the global registry 104a to complete any necessary transformation and complete the delivery via the network 101 on their behalf.

The method 600 may also operate to defer the message and/or document transmission until a specific time. In one example, the delivery may be scheduled based on the preferences of the recipient, the sender or both. As another example, the delivery service 525 may defer delivery of a non-urgent transmission where the service finds that it cannot meet the current delivery preference, but an upcoming change in preference (for example, at the start of business hours) will allow it to complete the delivery.

The operations described with reference to the system 500 and associated method 600 provide the recipient with an ability to individually tailor their preferences for delivery of documents and any associated message. In particular, the recipient may customize their preferences to improve the security of the documents that they receive. In addition, the system 500 may support approaches that employ a sender's delivery preferences either alone or in combination with the recipient's delivery preferences. For example, the operation 612 may include an evaluation of the sender's preferences.

The sender's preferences may include, for example: specific delivery priorities; delivery based on time, day of the week; the level of security required; and/or a transformation to transform the message or document into a desired format. For example, a sender who is at a law office may always prefer to transform documents to PDF to avoid sharing information otherwise available in the meta information such as prior comments, redlines or edits.

According to some embodiments, preference factors for both the recipient of the message and/or document transmission and the sender may be evaluated to determine a preferred transmission method. That is, on receipt of a digital transmission request, preference factors included in the account record 106a-n, 107a-n for each of the recipient and the sender, respectively, are evaluated by the system 500 to determine the preferred transmission method. According to one embodiment, the evaluation of the sender's preference factors is included in the operation 612 of the method 600.

Figure 7:
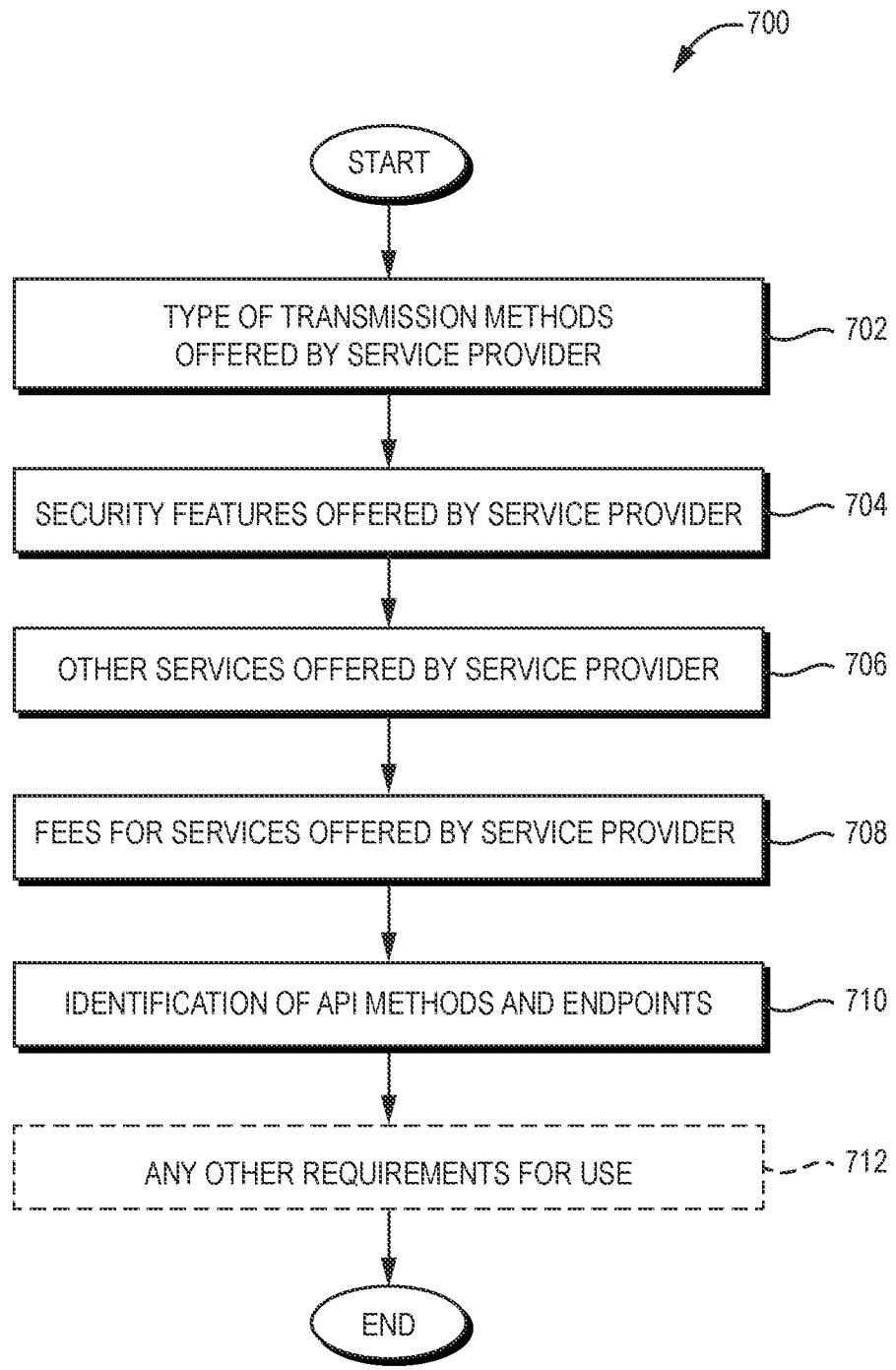
FIG. 7 is a flowchart of a method for registering a delivery service provider with a global registry according to one embodiment of the present invention.

In some embodiments, the delivery services 525 register with the global registry to utilize the services provided by the document delivery system 509. Referring now to FIG. 7 a flowchart of a method 700 for registration of a delivery service provider with a global registry is illustrated according to one embodiment of the present invention.

The registration process may include providing information concerning the type of delivery services that are provided by the delivery service (FIG. 7, operation 702). For example, any one delivery service may provide one or more of secure email services 530, secure SMS services 532, secure cloud storage services 534, Fax over IP services 536, Fax to Fax services 538 or other message/document delivery services. The delivery service may also provide information concerning the level of security offered with message/document transmissions by the delivery service (FIG. 7, operation 704). Examples include a delivery service that delivers without using encryption, those that provide encryption (including an identification of the type of encryption employed), and the type of authentication required, for example, single factor authentication or multi-factor authentication.

The registration process may also include an identification of any other services offered by the delivery service provider (FIG. 7, operation 706). For example, the delivery service may list the types of message/document transformations that are available with the service. It might provide other capabilities such as encryption levels, authentication types, maximum file sizes supported, additional costs associated with deliveries, etc.

The registration process includes an identification of the fees charged for the services offered by the delivery service provider (FIG. 7, operation 708). For example, the delivery service may charge enterprises or users using one or a combination of a charge for each transaction, a monthly subscription, and charges based on the options selected for the user's message/document deliveries. The latter category may include any of the following offered by the delivery service: OCR of text documents; anti-virus screening; telephony costs for faxes to international destinations; and document transformation where costs may depend on the type of transformation required. This allows different delivery services to distinguish themselves from one another based on fees, if any, charged for the similar services. The information also allows users (both senders and recipients) to consider cost when they provide information concerning their preferences. Depending on the embodiment, fees may be collected from the sender, the recipient or both.

According to one embodiment, the individual transaction "micropayments" may accumulate in the document delivery system 509 for periodic distribution to the responsible delivery service 525. According to another embodiment, the individual transaction "micropayments" may accumulate in the document delivery system 509 for periodic distribution to the responsible delivery service 525. According to another embodiment, the individual transaction "micropayments" are made directly to the responsible delivery service 525.

The delivery service may also identify any API methods or endpoints that are used by the service (FIG. 7, operation 710). This provides the document delivery system 509 with information that allows access to the delivery service's resources via the network 101. In practice, this information allows the various parties that use the system 500 (document delivery system 509, delivery services 525 and users 108, 124) to communicate with one another to perform the activities described herein. Optionally, the delivery service provider may also identify anything else required for enterprises and/or users to use their services (FIG. 7, operation 712).

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

Any step or act disclosed herein as being performed, or capable of being performed, by a computer or other machine, may be performed automatically by a computer or other machine, whether or not explicitly disclosed as such herein. A step or act that is performed automatically is performed solely by a computer or other machine, without human intervention. A step or act that is performed automatically may, for example, operate solely on inputs received from a computer or other machine, and not from a human. A step or act that is performed automatically may, for example, be initiated by a signal received from a computer or other machine, and not from a human. A step or act that is performed automatically may, for example, provide output to a computer or other machine, and not to a human.

The terms "A or B," "at least one of A or/and B," "at least one of A and B," "at least one of A or B," or "one or more of A or/and B" used in the various embodiments of the present disclosure include any and all combinations of words enumerated with it. For example, "A or B," "at least one of A and B" or "at least one of A or B" may mean: (1) including at least one A, (2) including at least one B, (3) including either A or B, or (4) including both at least one A and at least one B.

What is claimed is:

1. A method performed by at least one computer processor executing computer program instructions stored on at least one non-transitory computer-readable medium, the method comprising:
    (A) generating, for each of a plurality of users U, a mapping table including data representing mappings among: (1) a registry identifier of user U; (2) a first destination identifier of user U; and (3) a preferred transmission method of user U;
    (B) receiving a request to deliver an electronic package, the request including a specified destination identifier for delivery of the electronic package;
    (C) determining whether the specified destination identifier is included in the mapping table;
    (D) if the specified destination identifier is included in the mapping table, then using the mapping table to identify, based on the specified destination identifier, a preferred transmission method for transmitting the electronic package;
    (E) transmitting the electronic package using the preferred transmission method; and
    (F) before (E), using the mapping table to identify, based on the specified destination identifier, a second destination identifier;
    wherein (E) comprises transmitting the electronic package using the preferred transmission method to a destination specified by the second destination identifier.

2. The method of claim 1, wherein the specified destination identifier comprises an email address, and wherein the destination identifier comprises a conventional fax number.

3. The method of claim 2, wherein (E) comprises transmitting the electronic package using conventional fax transmission to the conventional fax number.

4. The method of claim 1, wherein the specified destination identifier comprises a conventional fax number, and wherein the destination identifier comprises an email address.

5. The method of claim 4, wherein (E) comprises transmitting the electronic package using email transmission to the email address.

6. The method of claim 1, wherein (A) further comprises:
    storing, in the mapping table, a plurality of preferred transmission methods of user U; and
    including data representing mappings among the registry identifier of user U, the first destination identifier of user U, and the plurality of preferred transmission methods of user U;
    the plurality of preferred transmission methods including a secure electronic file delivery method and at least one of an email transmission method, a conventional fax delivery method, an IP fax delivery method, and a text message delivery method.

7. The method of claim 6, wherein (D) further comprises evaluating a plurality of factors to identify the preferred transmission method from among the plurality of preferred transmission methods.

8. The method of claim 7, wherein (E) further comprises transmitting the electronic package using the secure electronic file delivery method.

9. The method of claim 7, wherein (E) further comprises transmitting the electronic package using at least one of the email transmission method, the conventional fax delivery method, the IP fax delivery method, and the text message delivery method.

10. The method of claim 7, wherein (D) comprises evaluating at least one of a time of day and a day of week to identify the preferred transmission method from among the plurality of preferred transmission methods.

11. The method of claim 7, wherein the specified destination identifier specifies a recipient, and wherein the plurality of factors includes at least one preference of the recipient.

12. The method of claim 7, wherein (D) further comprises:
automatically evaluating the plurality of factors to identify a set of conditions that exist when the outbound delivery request is received;
if a first set of conditions is identified, automatically selecting a first preferred transmission method as the current preferred transmission method; and
if a second set of conditions is identified, automatically selecting a second preferred transmission method as the current preferred transmission method,
wherein the second set of conditions differ from the first set of conditions, and
wherein at least one of the first preferred transmission method and the second preferred transmission method include the secure electronic file delivery method.

13. The method of claim 12, wherein a prioritization of the first preferred transmission method and the second preferred transmission method relative to one another varies with changes in the set of conditions including at least one of a time of day and a day of week.

14. The method of claim 7, wherein the plurality of factors includes at least one preference associated with a sender of the electronic package.

15. The method of claim 7, wherein (D) further comprises evaluating factors including metadata concerning contents of the at least one of the message and the document.

16. The method of claim 15, wherein the metadata includes information appearing in contents of a document included in the at least one of the message and the document, and
wherein the contents of the document are evaluated to determine at least one of a priority of the document and a confidential status of the document.

17. The method of claim 7, wherein the method further comprises:
transmitting the electronic package as an email message, using an email transmission method, and
attaching a document included in the request to the email message in a native format of the document.

18. The method of claim 7, further comprising:
transmitting the electronic package as an email message, using an email transmission method;
converting a document in the electronic package into a second document in at least one of a PDF and a TIFF format; and
attaching the document to the email message.

19. The method of claim 1, further comprising including the primary fax number in the destination identifier.

20. The method of claim 1, wherein (E) further comprises identifying a preferred transmission method based on a comparison of a first identifier uniquely identifying a company associated with a receiver of the electronic package and a second identifier uniquely identifying a company associated with a sender of the electronic package.

21. The method of claim 1, wherein the plurality of users includes users associated with a plurality of enterprises, respectively, and wherein (E) further comprises uniquely identifying each of the respective plurality of enterprises.

22. The method of claim 1, further comprising, for at least some of the plurality of users U, receiving, from the user U, input representing the preferred transmission method of user U.

23. The method of claim 1, wherein (D) comprises identifying the preferred transmission method based, at least in part, on the first destination identifier of user U.

24. The method of claim 1, wherein (D) further comprises:
if the specified destination identifier is included in the mapping table, then:
using the mapping table to identify, based on the specified destination identifier, a preferred file format in which to format the electronic package; and
converting a payload of the electronic package into the preferred file format to produce a converted payload of the electronic package; and
wherein (E) comprises transmitting the electronic package, including the converted payload of the electronic package, using the preferred transmission method.

25. The method of claim 24, wherein identifying the preferred file format comprises identifying the preferred file format based on the specified identifier.

26. The method of claim 25, wherein the data representing mappings comprises data representing mappings among: (1) the registry identifier of user U; (2) the first destination identifier of user U; (3) the preferred transmission method of user U; and (4) the preferred file format; and
wherein identifying the preferred file format comprises identifying the preferred file format based on the data representing the mappings.

27. The method of claim 24, wherein identifying the preferred file format comprises identifying the preferred file format based on the preferred transmission method for transmitting the electronic package.

28. The method of claim 1, wherein (E) comprises transmitting the electronic package using the preferred transmission method and transmitting the electronic package using a transmission method other than the preferred transmission method.

29. The method of claim 1, wherein (E) comprises using a delivery service to transmit the electronic package using the preferred transmission method, and wherein the method further comprises:
(F) receiving, from a sender of the electronic package, a payment; and
(G) providing at least part of the payment to the delivery service.

30. The method of claim 1, further comprising:
adding, to the mapping table, a mapping including a new preferred transmission method not previously in the mapping table, based on a public definition of the new preferred transmission method.

31. The method of claim 1, further comprising:
determining, based on the request to deliver the electronic package, whether the request is spam;
if it is determined that the request is spam, then not transmitting the electronic package in (E).

32. A system comprising at least one non-transitory computer-readable medium having computer program instructions stored thereon, the computer program instructions being executable by at least one computer processor to perform a method, the method comprising:
(A) generating, for each of a plurality of users U, a mapping table including data representing mappings among: (1) a registry identifier of user U; (2) a first destination identifier of user U; and (3) a preferred transmission method of user U;
(B) receiving a request to deliver an electronic package, the request including a specified destination identifier for delivery of the electronic package;
(C) determining whether the specified destination identifier is included in the mapping table;
(D) if the specified destination identifier is included in the mapping table, then using the mapping table to identify, based on the specified destination identifier, a preferred transmission method for transmitting the electronic package;
(E) transmitting the electronic package using the preferred transmission method; and
(F) before (E), using the mapping table to identify, based on the specified destination identifier, a second destination identifier;
wherein (E) comprises transmitting the electronic package using the preferred transmission method to a destination specified by the second destination identifier.

33. A method performed by at least one computer processor executing computer program instructions stored on at least one non-transitory computer-readable medium, the method comprising:
(A) generating, for each of a plurality of users U, a mapping table including data representing mappings among: (1) a registry identifier of user U; (2) a first destination identifier of user U; and (3) a preferred transmission method of user U;
(B) receiving a request to deliver an electronic package, the request including a specified destination identifier for delivery of the electronic package;
(C) determining whether the specified destination identifier is included in the mapping table;
(D) if the specified destination identifier is included in the mapping table, then using the mapping table to identify, based on the specified destination identifier, a preferred transmission method for transmitting the electronic package;
wherein (D) further comprises:
if the specified destination identifier is included in the mapping table, then:
using the mapping table to identify, based on the specified destination identifier, a preferred file format in which to format the electronic package; and
converting a payload of the electronic package into the preferred file format to produce a converted payload of the electronic package; and
(E) transmitting the electronic package using the preferred transmission method;
wherein (E) comprises transmitting the electronic package, including the converted payload of the electronic package, using the preferred transmission method.

34. A system comprising at least one non-transitory computer-readable medium having computer program instructions stored thereon, the computer program instructions being executable by at least one computer processor to perform a method, the method comprising:
(A) generating, for each of a plurality of users U, a mapping table including data representing mappings among: (1) a registry identifier of user U; (2) a first destination identifier of user U; and (3) a preferred transmission method of user U;
(B) receiving a request to deliver an electronic package, the request including a specified destination identifier for delivery of the electronic package;
(C) determining whether the specified destination identifier is included in the mapping table;
(D) if the specified destination identifier is included in the mapping table, then using the mapping table to identify, based on the specified destination identifier, a preferred transmission method for transmitting the electronic package;
wherein (D) further comprises:
if the specified destination identifier is included in the mapping table, then:
using the mapping table to identify, based on the specified destination identifier, a preferred file format in which to format the electronic package; and
converting a payload of the electronic package into the preferred file format to produce a converted payload of the electronic package; and
(E) transmitting the electronic package using the preferred transmission method;
wherein (E) comprises transmitting the electronic package, including the converted payload of the electronic package, using the preferred transmission method.

35. A method performed by at least one computer processor executing computer program instructions stored on at least one non-transitory computer-readable medium, the method comprising:
(A) generating, for each of a plurality of users U, a mapping table including data representing mappings among: (1) a registry identifier of user U; (2) a first destination identifier of user U; and (3) a preferred transmission method of user U;
(B) receiving a request to deliver an electronic package, the request including a specified destination identifier for delivery of the electronic package;
(C) determining whether the specified destination identifier is included in the mapping table;
(D) if the specified destination identifier is included in the mapping table, then using the mapping table to identify, based on the specified destination identifier, a preferred transmission method for transmitting the electronic package; and
(E) transmitting the electronic package using the preferred transmission method;
wherein (E) comprises using a delivery service to transmit the electronic package using the preferred transmission method, and wherein the method further comprises:
(F) receiving, from a sender of the electronic package, a payment; and
(G) providing at least part of the payment to the delivery service.

36. A system comprising at least one non-transitory computer-readable medium having computer program instructions stored thereon, the computer program instructions being executable by at least one computer processor to perform a method, the method comprising:
- (A) generating, for each of a plurality of users U, a mapping table including data representing mappings among: (1) a registry identifier of user U; (2) a first destination identifier of user U; and (3) a preferred transmission method of user U;
- (B) receiving a request to deliver an electronic package, the request including a specified destination identifier for delivery of the electronic package;
- (C) determining whether the specified destination identifier is included in the mapping table;
- (D) if the specified destination identifier is included in the mapping table, then using the mapping table to identify, based on the specified destination identifier, a preferred transmission method for transmitting the electronic package; and
- (E) transmitting the electronic package using the preferred transmission method;
- wherein (E) comprises using a delivery service to transmit the electronic package using the preferred transmission method, and wherein the method further comprises:
- (F) receiving, from a sender of the electronic package, a payment; and
- (G) providing at least part of the payment to the delivery service.

37. A method performed by at least one computer processor executing computer program instructions stored on at least one non-transitory computer-readable medium, the method comprising:
- (A) generating, for each of a plurality of users U, a mapping table including data representing mappings among: (1) a registry identifier of user U; (2) a first destination identifier of user U; and (3) a preferred transmission method of user U;
- (B) receiving a request to deliver an electronic package, the request including a specified destination identifier for delivery of the electronic package;
- (C) determining whether the specified destination identifier is included in the mapping table;
- (D) if the specified destination identifier is included in the mapping table, then using the mapping table to identify, based on the specified destination identifier, a preferred transmission method for transmitting the electronic package;
- (E) transmitting the electronic package using the preferred transmission method; and
- (F) adding, to the mapping table, a mapping including a new preferred transmission method not previously in the mapping table, based on a public definition of the new preferred transmission method.

38. A system comprising at least one non-transitory computer-readable medium having computer program instructions stored thereon, the computer program instructions being executable by at least one computer processor to perform a method, the method comprising:
- (A) generating, for each of a plurality of users U, a mapping table including data representing mappings among: (1) a registry identifier of user U; (2) a first destination identifier of user U; and (3) a preferred transmission method of user U;
- (B) receiving a request to deliver an electronic package, the request including a specified destination identifier for delivery of the electronic package;
- (C) determining whether the specified destination identifier is included in the mapping table;
- (D) if the specified destination identifier is included in the mapping table, then using the mapping table to identify, based on the specified destination identifier, a preferred transmission method for transmitting the electronic package; and
- (E) transmitting the electronic package using the preferred transmission method; and
- (F) adding, to the mapping table, a mapping including a new preferred transmission method not previously in the mapping table, based on a public definition of the new preferred transmission method.

39. A method performed by at least one computer processor executing computer program instructions stored on at least one non-transitory computer-readable medium, the method comprising:
- (A) generating, for each of a plurality of users U, a mapping table including data representing mappings among: (1) a registry identifier of user U; (2) a first destination identifier of user U; and (3) a preferred transmission method of user U;
- (B) receiving a request to deliver an electronic package, the request including a specified destination identifier for delivery of the electronic package;
- (C) determining whether the specified destination identifier is included in the mapping table;
- (D) if the specified destination identifier is included in the mapping table, then using the mapping table to identify, based on the specified destination identifier, a preferred transmission method for transmitting the electronic package;
- (E) determining, based on the request to deliver the electronic package, whether the request is spam;
- (F) if it is determined that the request is spam, then not transmitting the electronic package; and
- (G) if it is not determined that the request is spam, then transmitting the electronic package using the preferred transmission method.

40. A system comprising at least one non-transitory computer-readable medium having computer program instructions stored thereon, the computer program instructions being executable by at least one computer processor to perform a method, the method comprising:
- (A) generating, for each of a plurality of users U, a mapping table including data representing mappings among: (1) a registry identifier of user U; (2) a first destination identifier of user U; and (3) a preferred transmission method of user U;
- (B) receiving a request to deliver an electronic package, the request including a specified destination identifier for delivery of the electronic package;
- (C) determining whether the specified destination identifier is included in the mapping table;
- (D) if the specified destination identifier is included in the mapping table, then using the mapping table to identify, based on the specified destination identifier, a preferred transmission method for transmitting the electronic package;
- (E) determining, based on the request to deliver the electronic package, whether the request is spam;
- (F) if it is determined that the request is spam, then not transmitting the electronic package; and
- (G) if it is not determined that the request is spam, then transmitting the electronic package using the preferred transmission method.

* * * * *